United States Patent
Ballard et al.

[11] Patent Number: 5,991,847
[45] Date of Patent: Nov. 23, 1999

[54] DATA PATTERN CACHING FOR SPEEDING UP WRITE OPERATIONS

[75] Inventors: Clinton L. Ballard, Suquamish; Josh Canfield, Bremerton, both of Wash.

[73] Assignee: Acceleration Software International Corporation, Poulsbo, Wash.

[21] Appl. No.: 08/870,980

[22] Filed: Jun. 6, 1997

[51] Int. Cl.[6] ..................................... G06F 12/00
[52] U.S. Cl. ............................... 711/3; 711/130; 711/146; 711/147; 711/148
[58] Field of Search ................................ 711/111, 3, 130, 711/133, 147, 170, 202, 206, 146, 148; 395/712; 364/134

[56] References Cited

U.S. PATENT DOCUMENTS

| | | |
|---|---|---|
| 4,723,223 | 2/1988 | Hanada . |
| 4,947,319 | 8/1990 | Bozman . |
| 5,016,009 | 5/1991 | Whiting et al. . |
| 5,067,078 | 11/1991 | Talgam et al. ............................... 711/3 |
| 5,261,072 | 11/1993 | Siegel . |
| 5,293,608 | 3/1994 | Johnson et al. . |
| 5,313,612 | 5/1994 | Satoh et al. . |
| 5,355,467 | 10/1994 | MacWilliams et al. . |
| 5,414,850 | 5/1995 | Whiting . |
| 5,511,180 | 4/1996 | Schieve ............................... 711/172 |
| 5,535,116 | 7/1996 | Gupta et al. ............................... 364/134 |
| 5,584,007 | 12/1996 | Ballard . |
| 5,584,017 | 12/1996 | Pierce et al. ............................... 711/146 |
| 5,732,275 | 3/1998 | Kullick et al. ............................... 395/712 |

Primary Examiner—John W. Cabeca
Assistant Examiner—Nasser Moazzami
Attorney, Agent, or Firm—Steven P. Koda, Esq.

[57] ABSTRACT

A data pattern cache stores data patterns in units (i.e., a sector). A given data pattern is associated with one or more physical device address ranges which store such data pattern (e.g., sectors). Thus, although the same data pattern may occur as 10 redundant sectors for different files on different parts of a hard disk, the data pattern is stored in the data pattern cache once. One or more physical device sectors are linked to the data pattern.

18 Claims, 4 Drawing Sheets

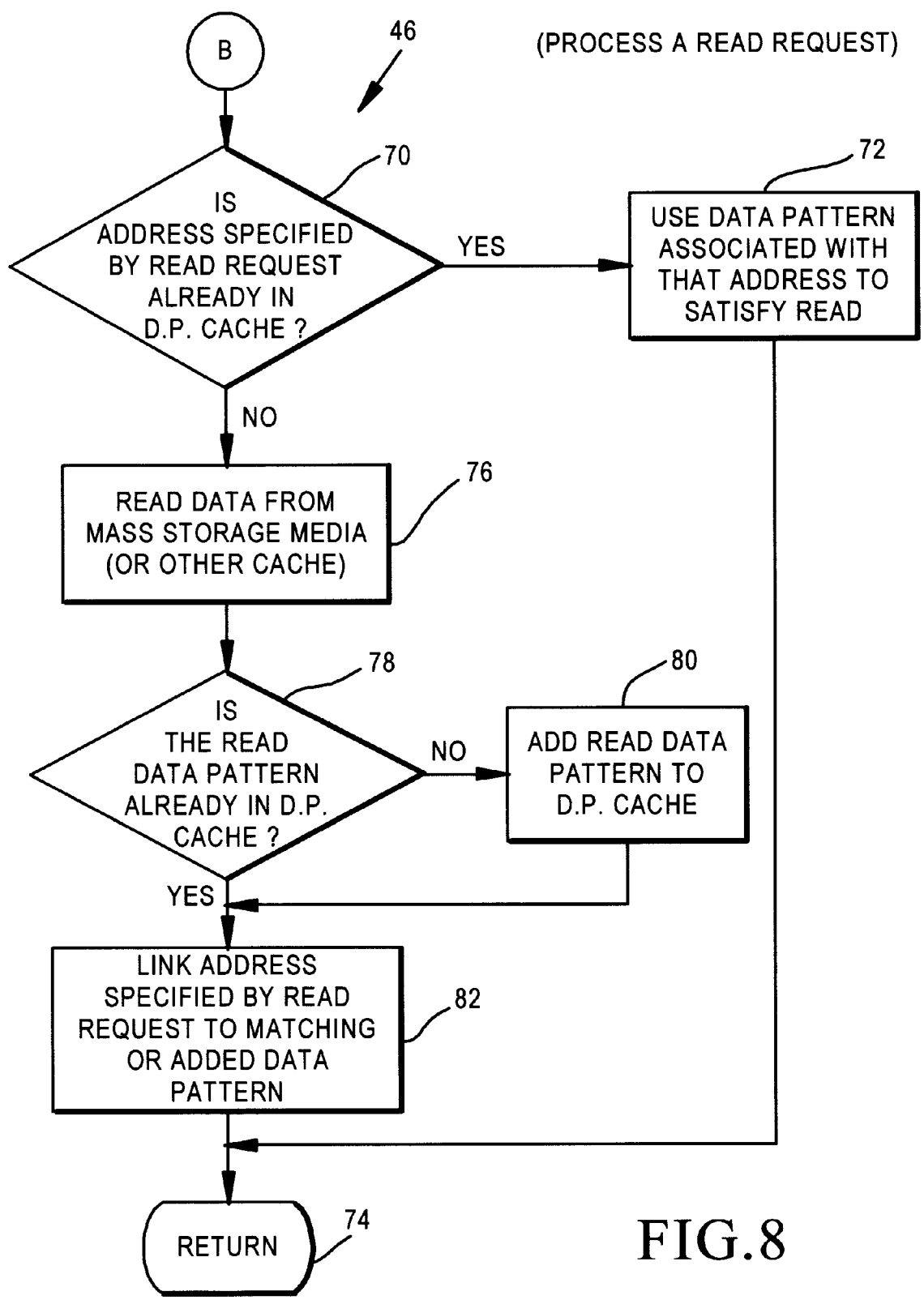

DATA PATTERN CACHING FOR SPEEDING UP WRITE OPERATIONS

BACKGROUND OF THE INVENTION

This invention relates to methods and apparatus for improving data access by storing recently used data in a cache, and more particularly to a method and apparatus for caching most recently used data patterns.

Conventionally, when a read operation or a write operation is performed on a computer system having a data cache, the data read or written is stored in the cache. Associated with the cache are hashing tables for correlating the data to addresses (e.g., physical device addresses). Flags are also associated with the data to determine whether the data in the cache for the requested address is valid, and maintain data coherency between the cache contents and the permanent storage device contents.

SUMMARY OF THE INVENTION

According to the invention, a data pattern cache is conceived and implemented. A data pattern cache stores data in units (i.e., a sector). A given data pattern is associated with one or more physical device addresses which store such data pattern. Thus, although the same data pattern may occur as 10 redundant sectors for different files on different parts of a hard disk, the data pattern is stored in the data pattern cache once. One or more physical device sectors are linked to the data pattern.

According to one aspect of the invention a data pattern is stored in the cache upon a read or a write operation. The benefit is apparent when the writes are considered, but first consider the read operations. Upon a read, if the sector address is already present in the cache and the data is valid then the data is read from the cache. If the sector address is not present in the cache, then the sector is read from the hard disk. The data for such sector is compared to the data patterns in the cache. If it matches a data pattern in the cache, then the sector address is linked to such pattern. If not, then the data is added to the cache as another pattern.

Consider next the write operations. Upon a write operation the pattern is checked to see if it is already present in the data cache. If it is present, then the sector address is linked to the pattern. If the data pattern is not present in the cache, then the pattern is added to the cache and the sector address is linked to the pattern. The rest of the cache also is tested to see if the sector address was previously linked to another pattern. If it had been linked, then such link is severed. The write operation then is complete. In write through mode, however, the data also is written to the hard disk.

According to another aspect of the invention, write operations are eliminated when the data pattern to be written is already present in the cache for the specified address. Conventionally, applications programs will cause an entire file to be rewritten to the mass storage device, even when only a small portion of the file is altered. According to this invention, the write request is processed at the input/output system level. At such level the write is a set of writes with each write corresponding to a block of memory. (Conventionally, data is read from or written to memory in units of a memory block.) A file may encompass multiple blocks of memory, each block encompassing multiple sectors of memory, each sector encompassing multiple bytes (e.g., 512) of memory. When an application program changes a portion of only one sector, then only one block of memory has a different data patterns. For such example, when processing the group of writes which correspond to the application's request to write the file, one write has a different data pattern, the other writes have the same data pattern. Conventionally all such writes are performed. According to this invention, the data patterns and addresses are checked. For those memory blocks already in the cache having the same data pattern, there is no need to rewrite the data (i.e., the same data) to the cache and the mass storage device. For the memory block having the changed data, the data pattern is written to cache and the mass storage device. As a result, the write file operation is improved. Similar write improvement is achieved for a write of any memory block already in the cache with an unchanged data pattern whether or not initiated by an application program's 'write file to disk' request. According to another aspect of the invention, the cache and operations are implemented at the sector or multiple word level instead of at the memory block level.

According to another aspect of the invention, some embodiments include an added feature in which a key for a cache entry is based upon a file identifier and all offset relative to the start of the file. Upon a read or a write the key is derived from the data request. The cache entry is in some prescribed unit (e.g., sector, portion of sector). Upon a read or write the same steps as above are performed. The patterns, however, are linked instead to the key based on the file identifier and an offset within the file. An advantage of this keying method is that when data is appended to a file, or when only a portion of a file is changed, much of the cache contents for such file remains valid and only the prescribed unit encompassing the change is updated. Because physical addresses are not in the key the cache entry remains valid for much of the file. Only the portion of the file with changes is to be written to mass storage (e.g., hard drive).

According to another aspect of this invention, the hard disk drive is scanned off-line to find common data patterns (e.g., redundant sectors). All or some of such patterns are preloaded in the data pattern cache. The number of occurrences of a pattern is used to provide a weight which gives priority for keeping such pattern(s) in the cache longer before being demoted when patterns are to be added to the cache.

According to one advantage of this invention the time for a processor to perform a write operation is reduced in instances where the data pattern is already present in the cache.

These and other aspects and advantages of the invention will be better understood by reference to the following detailed description taken in conjunction with the accompanying drawings.

BRIEF DESCRIPTION OF THE DRAWINGS

FIG. 8 is a flow chart of a portion of the data pattern cache computer program for handling read operations.

DESCRIPTION OF SPECIFIC EMBODIMENTS

Overview

Figure 1:
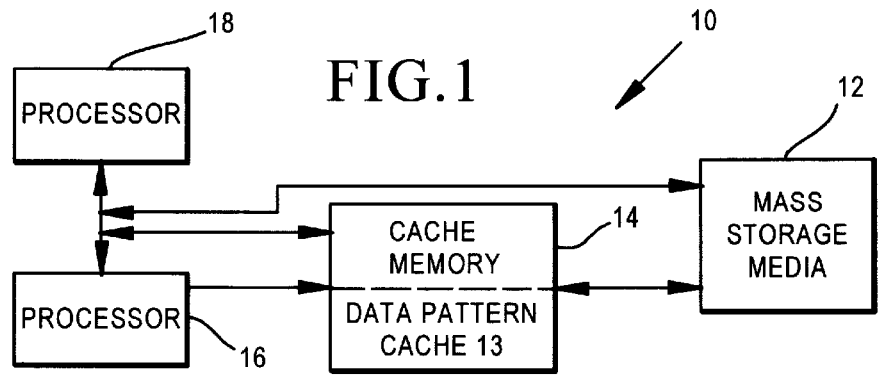
FIG. 1 is a block diagram of part of a computing system embodying the data pattern cache of this invention.

FIG. 1 shows a functional block diagram of a portion of a computer system 10 implementing a data pattern cache 13 according to embodiments of this invention. The computer system 10 includes a mass storage media 12, a cache memory 14, a processor 16 for managing the caching method of this invention, and a processor 18 which generates data requests directed to addresses of the mass storage media 12. The mass storage media 12 serves as a permanent or long-term storage memory. Exemplary mass storage devices having a mass storage media include a hard disk drive, floppy disk drive, CD-ROM drive, bernoulli disk drive or other drive system for accessing permanent or replaceable disks, such as floppy disks, magnetic disks, magneto-optical disks, or optical disks. The mass storage media 12 has physical addresses at which data is stored. Typically, the storage media 12 includes a partition used by a file system of the computer system 10. The file system is a logical data construct. Data and computer programs are stored in files. The logical addresses and file system are specified by an executing application computer program. Such addresses are translated at the operating system level or device level of the system 10 from logical addresses to physical addresses.

The cache memory 14 is storage apparatus having a faster access time than the mass storage device. To enable faster operation of the computer system 10 it is desirable that data be available to the processor when needed. Thus, data is moved from the mass storage media 12 into cache memory 14 where it can be accessed faster. An exemplary storage apparatus embodying cache memory 14 is random access memory (RAM). All or a portion of the RAM serves as cache memory 14. Portions of a computer program and/or data files are loaded into the cache memory 14 to speed up execution of the program and processing of data.

One aspect of this invention is directed toward a data pattern cache 13. Thus, all or a portion of the RAM, and all or a portion of the cache memory 14 serves as a data pattern cache 13. The data pattern cache 13 is implemented by a computer program or by microcode which manages the area of cache memory 14 serving as the data pattern cache 13. In either case software is executed by a processor 16. The processor 16 manages the data pattern cache 13. Either the same processor 16 or another processor serves as a processor 18 which executes a computer program which generates read requests and write requests (i.e., data access requests) to the mass storage device.

One or more processors 18 serve to execute an operating system and one or more application computer programs. In some embodiments there are multiple processors for executing the operating system and application programs. System utilities and/or operating system extension programs also are executed according to some computer system 10 embodiments. Conventional operating systems include DOS, Windows, Windows NT, Mac O/S, OS/2, and various UNIX-based operating systems. The computer system 10 in the process of executing the operating system and zero or more computer programs defines an operating environment for a user to interact with the computer, operating system and executing computer program.

Figure 2:
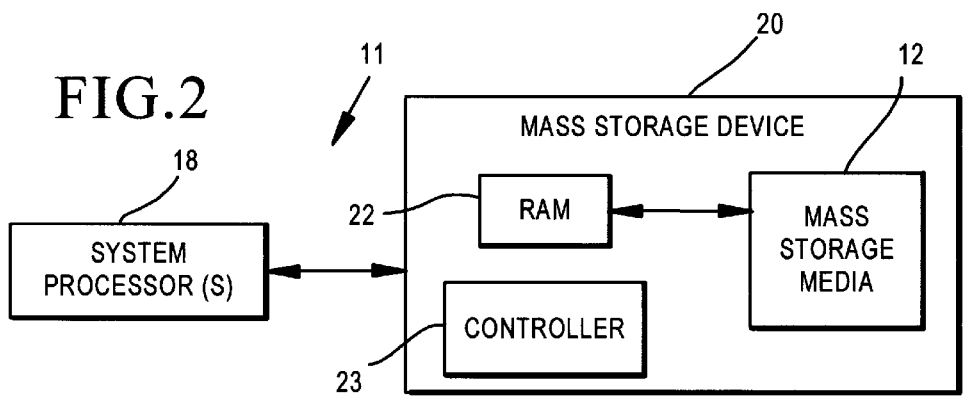
FIG. 2 is a block diagram of a partial configuration of a computing system implementing a data pattern cache according to an embodiment of this invention.

FIG. 2 shows one configuration for implementing the data pattern cache of this invention. The computer system 11 includes one or more system processors 18 and a mass storage device 20. The mass storage device 20 includes the mass storage media 12, RAM 22 and a controller 23. The RAM 22 serves as a cache memory 14 at which the data pattern cache is implemented. The controller 23 serves as the processor 16 which manages the data pattern cache. The processor(s) generate data access requests to the mass storage device 20.

Figure 3:
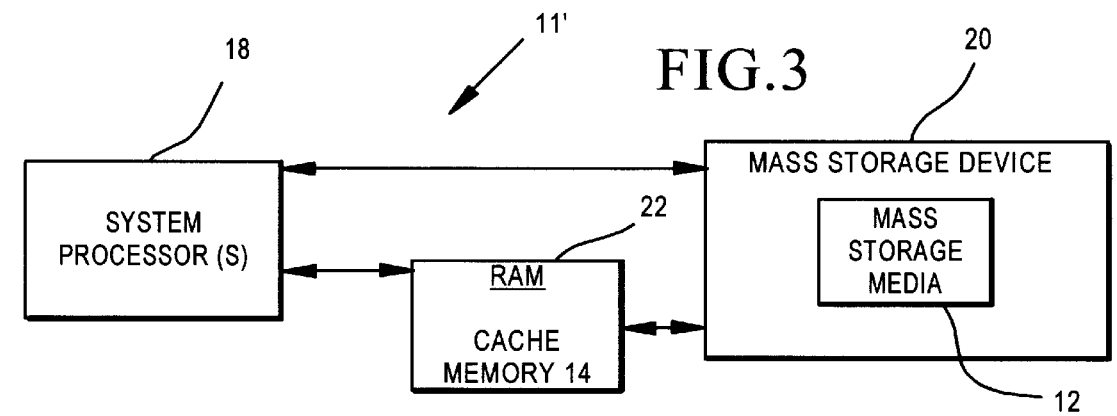
FIG. 3 is a block diagram of a partial configuration of a computing system implementing a data pattern cache according to another embodiment of this invention.

FIG. 3 shows another configuration for implementing the data pattern cache of this invention. The computer system 11' includes one or more system processors 18, RAM 22 and a mass storage device 20. The mass storage device 20 includes at the least the mass storage media 12. The RAM 22 serves as a cache memory 14 at which the data pattern cache is implemented. The processor(s) 18 generate data access requests to the mass storage device 20. One or more of the processors 18 also serves as the processor 16 which manages the data pattern cache.

Figure 4:
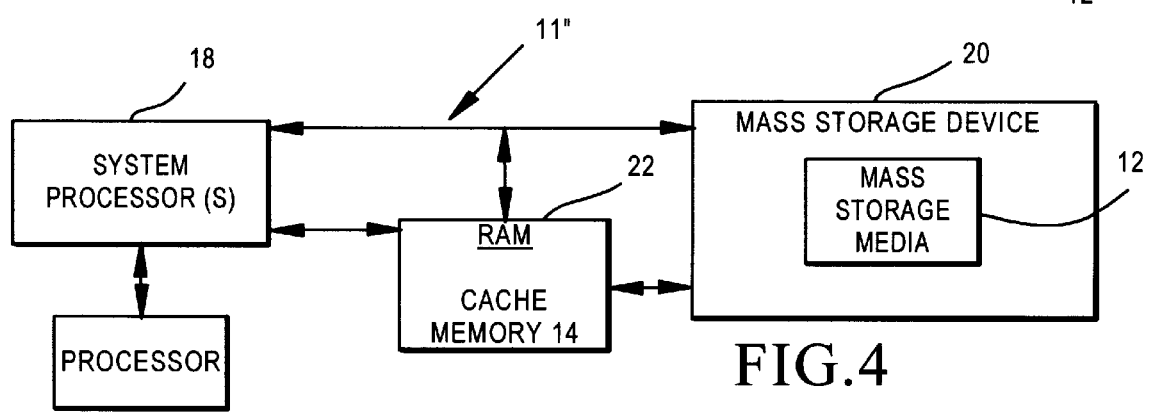
FIG. 4 is a block diagram of a partial configuration of a computing system implementing a data pattern cache according to another embodiment of this invention.

FIG. 4 shows another configuration for implementing the data pattern cache of this invention. The computer system 11" includes a processor 16, one or more system processors 18, RAM 22 and a mass storage device 20. The mass storage device 20 includes the mass storage media 12. The RAM 22 serves as a cache memory 14 at which the data pattern cache is implemented. The processor(s) 18 generate data access requests to the mass storage device 20. The processor manages the data pattern cache.

Data Pattern Cache

Figure 5:
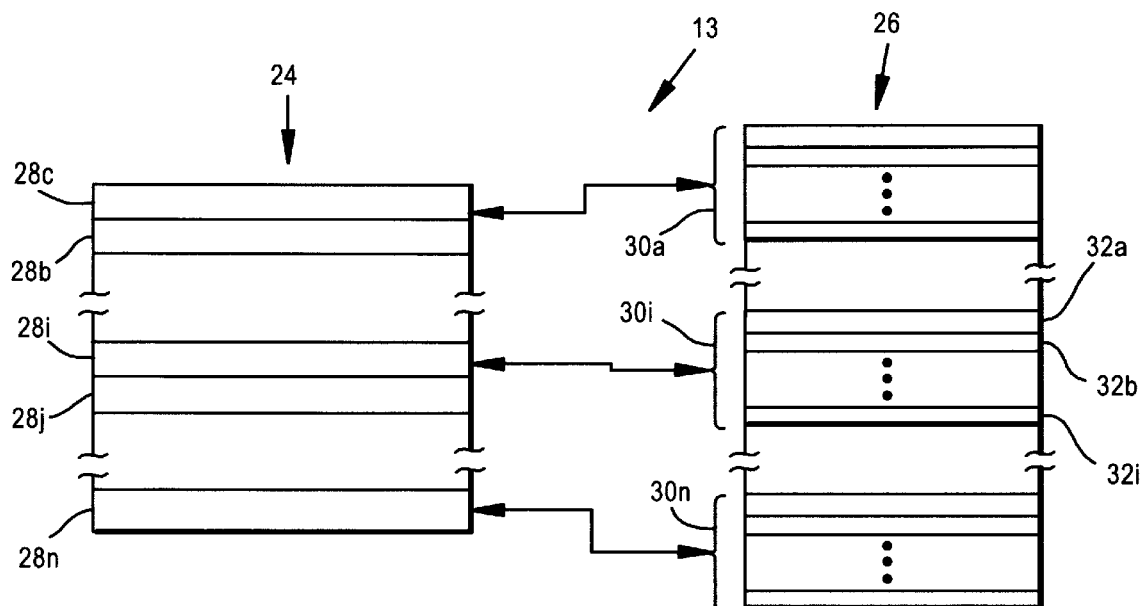
FIG. 5 is a block diagram of a data pattern cache according to an embodiment of this invention.

Referring to FIG. 5, the data pattern cache 13 is formed in a portion of cache memory 14. The data pattern cache 13 includes an area 24 for storing data patterns and a table 26 of links. The data pattern is of a prescribed size. Each data pattern item 28i stored in the area 24 has the same size. In a preferred embodiment the prescribed size is a sector. The sector is a physical address unit of the mass storage media 12. For example, a hard disk is organized into physical sectors of addresses. Each sector includes a prescribed number of bytes. In conventional hard disk drives a sector is 512 bytes. In alternative embodiments the prescribed size of the data pattern is a multiple of sectors or a portion of a sector. Preferably, the prescribed size is at least a multiple number of words, where a word size is defined by the computer architecture hosting the data pattern cache 13. There is a tradeoff of more computation for a smaller prescribed size. Empirically it has been found that a sector is an effective prescribed size for improving caching. In one embodiment the area 24 has the capacity to store 512 patterns, although the number of patterns varies for different embodiments. Again, there is a trade-off. The more patterns sorted the more computation in searching for a pattern match when using non-hashing techniques. When using hashing techniques, the search time is generally constant although more RAM is used than for a table using non-hashing techniques.

In one embodiment the table 26 links each data pattern to one or more physical address ranges. For each data pattern 28 stored in area 24, there is at least one corresponding sector (i.e., range of physical addresses) on the mass storage media 12. For redundant data patterns on the mass storage media, the sector address for each of the redundant data patterns is linked to the corresponding data pattern item 28 stored in area 14. A first portion 30a of the table 26 stores physical addresses for one or more redundant sectors having the first data pattern 28a. Another portion 30i of the table 26 stores physical addresses 32 for one or more redundant sectors having another data pattern 28i. In one embodiment the size of each portion 30 varies dynamically so that RAM address space is efficiently allocated. For example, if a portion 30 only includes two address ranges (e.g., sector addresses) then instead of allocating a prescribed portion of the table (e.g., 10 units), only one unit is allocated, or only one plus one or two open slots for future links to the corresponding data pattern 28. Referring to table 26 of FIG. 5, each slot 32 in a portion 30 is for storing an address associated with a mass storage media range of addresses (e.g., sector or other prescribed size). In the preferred embodiment the table 26 is implemented using a doubly linked list. For each data pattern in area 24 there is a beginning pointer and an ending pointer. The two pointers delimit a list of entries 32 corresponding to the data pattern 28. Thus, the list of entries 32 define the portion 30 of the table 26 corresponding to the data pattern 28. In one embodiment the two pointers for a given data pattern 28 are stored with such pattern in the area 24. In an alternative embodiment each portion 30 of the table 26 has a prescribed length enabling linkage to up to a prescribed number of physical address ranges, (e.g., 10).

Data Pattern Cache Management

Figure 6:
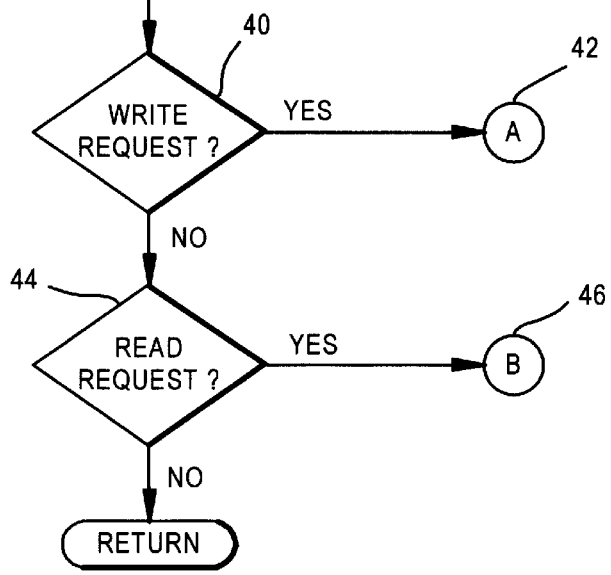
FIG. 6 is a flow chart of a method for managing the data pattern cache of FIG. 5.
Figure 7:
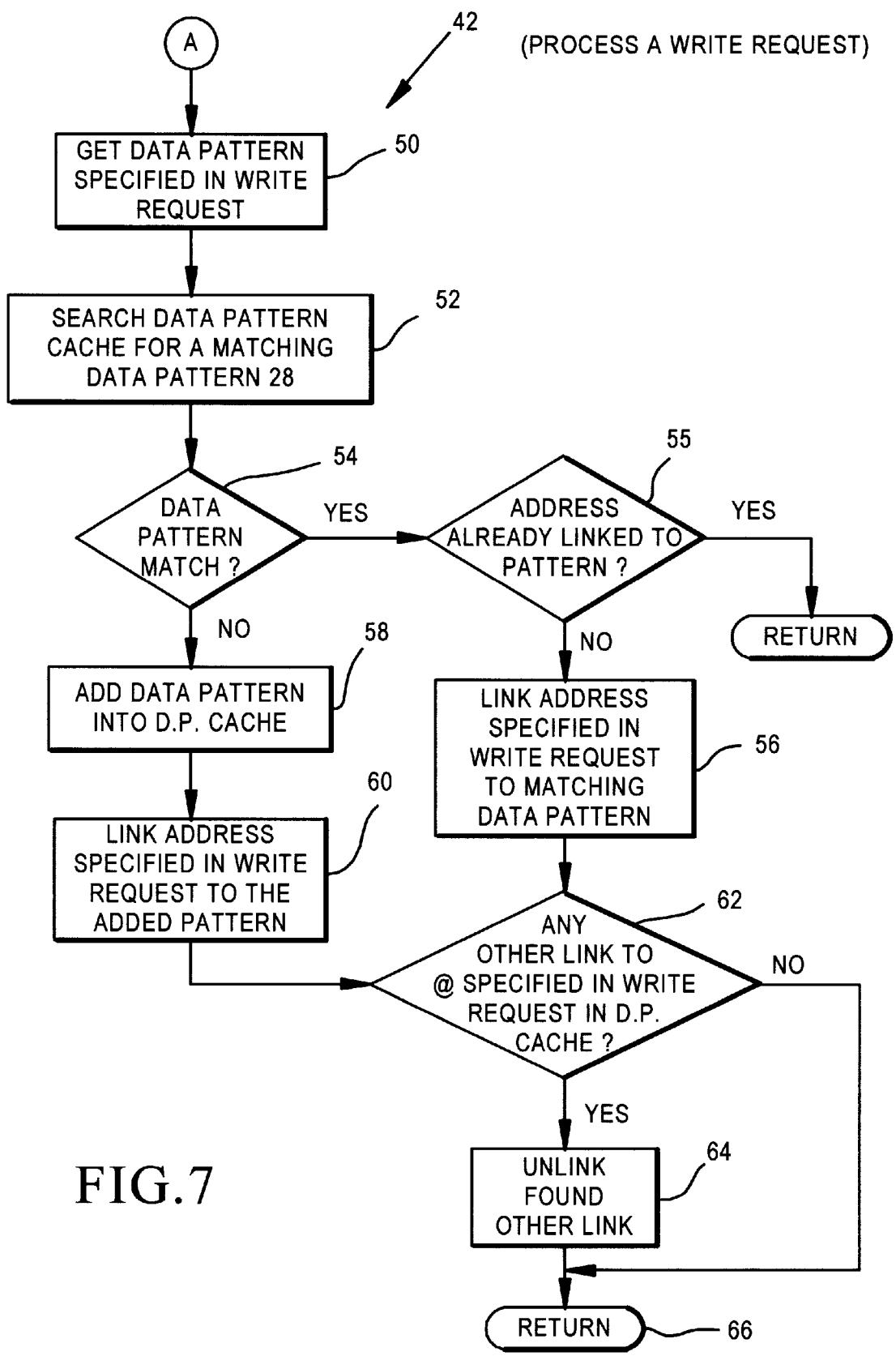
FIG. 7 is a flow chart of a portion of the data pattern cache (computer program for handling write operations.

FIGS. 6–8 are flow charts of a computer program which manages the data pattern cache 13. The computer program is executed by a processor 16. The processor 16 as described above in alternative embodiments is a controller for the mass storage device 20 (see FIG. 2) or is a processor separate from the mass storage device 20 (see FIGS. 3 or 4). When separate the processor 16 is embodied by one or more systems processors 18 (see FIG. 3) or by a separate processor 16 (see FIG. 4). According to one embodiment, the computer program responds to Read and Write calls to the operating system's input/output system. For example, an interrupt or a trap occurs for a write request or a read request to data stored on the mass storage device 20. At step 40 the data access request is checked to determine if it is a write request. If so, then at step 42 the flow chart of FIG. 7 is executed. If not, then at step 44 the data request is checked to see if it is a read request. If so, then at step 46 the flow chart of FIG. 8 is executed.

Referring to FIG. 7, to process a write request the data pattern specified in the write request is obtained at step 50. Because the operation is intercepted at the I/O system level (rather than the file system level), the data requests already are in memory block size and are memory block aligned. For sub-sector sized file system requests, conventional techniques are used to convert the request into a block aligned I/0 request. Thus, all reads, and writes are in multiples of a sector (e.g., 512 byte multiples). For a cache implemented at sector or sub-sector units, conventional blocking techniques are used to convert the request into a memory-block-aligned I/O request.

At step 52 the pattern parsed from the write request is compared to data patterns within the data pattern cache 13. At step 54 the data patterns are tested to see if there is a match. If there is a match, then there is no need to write the data pattern to cache 13. At step 55, the address range specified in the request is compared to the address ranges linked for the matching data pattern. If the address range is already present and linked, then the write operation is complete. There is no need to write the data to the mass storage media 12. If the address range is not already linked for the matching data pattern, then at step 56 the address parsed from the write request is linked to the matching data pattern already stored in the data pattern cache 13. For example if data pattern 28i is the matching pattern, then the address specified in the write request is linked by adding an entry (e.g., 32b) to the portion 30i of the address linking table 26 (see FIG. 5). The address specified in the write request is used to derive a value to store in the address linking table 26. In one embodiment the value stored in the slot 32b is the physical address on the mass storage device 12 that corresponds to the logical address specified in the write request. In another embodiment the value stored is the logical address from the write request adjusted to be to be a logical address corresponding to a sector starting address. In yet another embodiment the logical address specified in the write request is used to derive a key which is stored in the slot 32b.

If during the search of the data pattern cache, no match is found at step 54, then at step 58 the data pattern specified in the write request is stored in the data pattern cache. At step 60 the address specified in the write request is used to derive a value to store in the address linking table 26. The value stored is either a physical address, a logical address or a key. In each case the value stored corresponds to a starting address for a physical sector corresponding to the logical address specified in the write request. Thus, the sector address is stored, a logical address corresponding to the sector address is stored, or a key translatable to a starting sector address is stored.

At step 62 the address linking table 26 is checked to see if a value is already stored in the table 26 which corresponds to the address specified in the write request. In the case following step 60, the test is whether any slot other than the one filled, at step 60 stores a value corresponding to the address in the write request. In the case following step 56, the test is whether any slot other than the one filled at step 56 stores a value corresponding to the address in the write request. Again a corresponding value is a physical sector address, a logical address corresponding to the sector address, or a key translatable to the sector address. If for example such redundant value is stored in portion 30n, then the value in the corresponding slot of portion 30n is deleted or invalidated. The write operation is now complete. At step 66 the program returns.

Referring to FIG. 8, to process a read request at step 70 the address specified in the read request is transformed into the format that it would be in if the sector which includes such address were present in the data pattern cache 13. If the value corresponding to such address is already present in table 26, then the data pattern stored in the cache 13 for such value is used at step 72 to satisfy the read request. For example, if the value corresponding to the address specified in the read request is stored in slot 32b of portion 30i of table 26, then the data pattern 28i is the corresponding data pattern which is used to satisfy the read request. Along such branch the program then returns at step 74.

If, however, the value corresponding to such address is not present in table 26, then at step 76 data is read from the mass storage device 20 (or another cache) to obtain the data. Such data is used to satisfy the read request. Data of at least the prescribed size for a data pattern is read from the mass storage device 20. At step 78, the data read is compared to data patterns in area 24 of the data pattern cache 13 to see if the data pattern already is present in the cache 13. If not already present, then at step 80 the sector (e.g., for data patterns in which the prescribed size is a sector), is added to the data pattern cache as another data pattern in area 24. At step 82, the address specified in the read request is linked to the entry in the data pattern cache (e.g., the added entry at step 80 or the already present matching entry found at step 78). Linking as described for processing a write request encompasses storing a value in a portion of table 28 corresponding to the data pattern added or found. The value is a physical sector address, a logical address corresponding to the sector address, or a key translatable to the sector address. Then at step 74 the program returns.

According to a preferred embodiment a hashing algorithm is used to limit the search time to find a matching pattern or address. For example, in an embodiment for a data pattern cache having a capacity of 200,000,000 sectors, a binary search would include approximately 30 iterations. Using an open addressed hash table the searches for such embodiment average approximately 5 iterations. Other search methods would use less RAM, but require more processing time for the searching.

Following is a description of a key stored in table 26 for an embodiment in which the values stored in table 26 are keys derived from the logical address specified in the data access request (e.g., read request or write request). The key includes a file identifier portion and a file offset portion and thus refers to a logical address. The file identifier portion in one embodiment is 9 bits long allowing data pattern caching for up to 512 files. The number of bits may vary for alternative embodiments. The offset portion identifies an offset within the file for the data specified in the data access request. Offsets occur in prescribed size units, where the prescribed size is the prescribed size of the data pattern (e.g., a sector). Such offset also occurs at a start of a physical sector (for a prescribed size equal to a sector). With the key identifying a logical address, the translation from logical address to physical address or visa-versa is performed at a different level of operation (e.g., a device drive or at a portion of the operating system). As a result, if a file is moved to a different physical location the translation changes, but not the key stored in the cache 13. A benefit of using such a key is realized for the case where data is appended to a file. Because the file got larger, the file system (or a disk defragmentation utility) may move the file to another location on the mass storage media 12 to fit the file. The translation table (not part of the cache 13 in this embodiment) thus changes. The entries for the redundant data in the data pattern cache 13 however do not change since a logical address-based key is used. Thus, at the application program level, processing resumes faster because in satisfying the write much of the file is already present in the cache 13. In a best case scenario, only the portion appended is not already present in the cache 13. Such appended portion results in adding a data pattern to the cache 13. Thus, the write involves only writing a small portion of the file rather than the whole file. The movement on the mass storage device is performed apart from the write operation without slowing up system processing or cache 13 management.

According to another aspect of the invention, off-line searching of the mass storage media 12 is performed to preload the data pattern cache 15. For each sector on the media 12, the sector contents are input to an algorithm which derives a 32-bit value. Any function which depends on a majority of the bytes in the sector is fine. The calculated value then is associated with the sector. When a 32-bit value is achieved for each sector, then the list is rescanned to group sectors having a common 32-bit value. Each group then is processed to determine which sectors within the group have the same pattern. A weight is assigned for each redundant pattern based upon how many sectors share such pattern. Those data patterns occurring most frequently are preloaded into the data pattern cache 15.

According to another aspect of the invention, partial write suppression is achieved for a write request of multiple sectors in which not all of the sectors are identical. Identical sectors at the beginning and end of the address range are detected. The write request then is shrunk to begin at the first non-identical sector and end at the last non-identical sector. In addition for another alternative embodiment, groups of identical sectors at other portions within the address range are eliminated by breaking down the write request into multiple smaller write requests range with non-identical data patterns.

Write Suppression

According to an aspect of this invention, a write operation is suppressed when the write request specifies a data pattern I address range already occurring in a cache memory. The cache memory is either a conventional cache memory or the data pattern cache described above. At one step the write operation is intercepted. The cache is checked to see if data for such address range is already present in the cache. If so, and if the data already stored is the same as in the write request, then the write operation is complete. It terminates successfully without having to rewrite the same data into the cache memory or onto the mass storage media 12. For a conventional cache the address specified in the write request is used to key into the cache memory. If an entry occurs in the cache for such address range, then the stored data is compared to that specified in the write request. If there is a match, then there is no need to write the data to the mass storage device 12. It is already there on the mass storage device 12 for such address range. For a data pattern cache, either the data pattern or the address range is used to search the cache. The other of the data pattern and address range then are checked on a match to determine if the data pattern is already present for the specified address range.

In some embodiments such interception occurs at the I/O system level. At such level the write is a set of writes with each write corresponding to a block of memory. (Conventionally, data is read from or written to memory in units of a memory block.) A file may encompass multiple blocks of memory, each block encompassing multiple sectors of memory, each sector encompassing multiple bytes (e.g., 512) of memory. When an application program changes a portion of only one sector, then only one block of memory has a different data pattern. For such example, when processing the group of writes which correspond to the application's request to write the file, one write has a different data pattern, the other writes have the same data pattern. Conventionally all such writes are performed. According to this invention, the data patterns and addresses are checked. For those memory blocks already in the cache having the same data pattern, there is no need to rewrite the data (i.e., the same data) to the cache and the mass storage device. For the memory block having the changed data, the data pattern is written to cache and the mass storage device. As a result, the write file operation is improved. Similar write improvement is achieved for a write of any memory block already in the cache with an unchanged data pattern whether or not initiated by an application program's 'write file to disk' request. In an alternative embodiment the cache and cache management operations are implemented at the sector or multiple word level instead of at the memory block level. By testing the addresses and the data contents write operations are suppressed for a conventional cache or a data pattern cache. Suppressing the write operations under the given conditions reduces input/output activity with the mass storage device 20.

Meritorious and Advantageous Effects

According to one advantage of this invention the time for a processor to perform a write operation is reduced in instances where the data pattern is already present in the cache. According to another advantage of this invention the time for a processor to perform a write operation is even more reduced when the data pattern is both in the cache and in the mass storage device for the specified field of addresses (e.g., memory block). Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A cache apparatus for storing data patterns that are read from or to be written to a mass storage device, comprising
    a memory for storing a plurality of data patterns of a prescribed size;
    an address linking means which associates each one data pattern of the plurality of data patterns with at least one address range on the mass storage device, wherein for at least one of the plurality of data patterns there are associated multiple, non-coincident address ranges on the mass storage device, the mass storage device for storing the data pattern redundantly for said at least one of the plurality of data patterns; and
    wherein the prescribed size is at least multiple words.

2. The cache apparatus of claim 1, wherein the mass storage device is a hard disk organized in sectors, and the prescribed size is a sector.

3. A cache apparatus for storing data patterns that are read from or to be written to a mass storage device, comprising:
    memory for storing a plurality of data patterns of a prescribed size;
    address linking means which associates each one data pattern of the plurality of data patterns with at least one address range on the mass storage device, wherein for at least one of the plurality of data patterns there are associated multiple, non-coincident address ranges on the mass storage device, the mass storage device for storing the data pattern redundantly for said at least one of the plurality of data patterns, wherein the prescribed size is at least multiple words; and
    a processing means, and wherein for a write operation of a data pattern to a mass storage device, in which the write operation specifies a first address range, the processing means comprises means for testing the data pattern to be written to determine if a copy of the data pattern already exists in the memory, and wherein the address linking means associates the first address range with the already existing copy of the data pattern in memory when such pattern already exists in memory.

4. The cache apparatus of claim 3, wherein the processing means further comprises means for testing whether the first address range already is linked in memory to a different data pattern than the data pattern for the write operation, and wherein the address linking means unlinks the first address range to different data pattern.

5. A cache apparatus for storing data patterns that are read from or to be written to a mass storage device, comprising
    a memory for storing a plurality of data patterns of a prescribed size;
    an address linking means which associates each one data pattern of the plurality of data patterns with at least one address range, wherein for at least one of the plurality of data patterns there are associated multiple, non-coincident address ranges, the mass storage device for storing the data pattern redundantly for said at least one of the plurality of data patterns;
    a key for accessing the cache, the key having a file identifier portion and an offset portion, the file identifier portion of a given key specifying a file which includes a data pattern stored in the memory, the offset portion specifying an offset within the file at which the stored data pattern is located;
    wherein the prescribed size is at least multiple words.

6. The cache apparatus of claim 5, wherein the mass storage device is a hard disk organized in sectors, and the prescribed size is a sector.

7. The cache apparatus of claim 5, further comprising means for scanning the mass storage device to identify any redundant data patterns that are of the prescribed size.

8. A method for caching data patterns in cache memory that are read from or to be written to a mass storage device, comprising the steps of:
    storing a first data pattern in the cache memory in response to either one of a write operation or a read operation;
    linking the first data pattern to a first address range specified in said either one of the write operation or read operation;
    for a subsequent write operation of the same data pattern which specifies a second address range different than the first address range, linking the first data pattern to the second address range.

9. The method of claim 8, wherein the mass storage device is a hard disk organized in sectors, and wherein size of the data pattern is a sector.

10. A method for caching data patterns in cache memory that are read from or to be written to a mass storage device, comprising the steps of:
    storing a first data pattern in the cache memory in response to either one of a write operation or a read operation;
    linking the first data pattern to a first address range specified in said either one of the write operation or read operation;
    for a subsequent write operation of the same data pattern which specifies a second address range different than the first address range, linking the first data pattern to the second address range;
    testing whether the second address range already is linked in memory to a different data pattern than the first data pattern; and
    unlinking the second address range to the different data pattern.

11. The method of claim 8, further comprising the step of
    storing a second data pattern in the cache memory in response another one of either one of a write operation or a read operation;
    linking the second data pattern to a mass storage device third address range specified in said another one of said either one of the write operation or read operation;
    for a subsequent read operation of the same data pattern as the second data pattern which specifies a fourth address range different than the third address range, linking the second data pattern to the fourth address range.

12. A method for caching data patterns in cache memory that are read from or to be written to a mass storage device, comprising the steps of:
    storing a first data pattern in the cache memory in response to either one of a write operation or a read operation;

linking the first data pattern to a first address range specified in said either one of the write operation or read operation; and for a subsequent write operation of the same data pattern which specifies a second address range different than the first address range, linking the first data pattern to the second address range;

wherein the first address range and second address range are mass storage device physical address ranges.

13. A method for caching data patterns in cache memory that are read from or to be written to a mass storage device, comprising the steps of:

storing a first data pattern in the cache memory in response to either one of a write operation or a read operation;

linking the first data pattern to a first address range specified in said either one of the write operation or read operation; and for a subsequent write operation of the same data pattern which specifies a second address range different than the first address range, linking the first data pattern to the second address range;

wherein the first address range is transposed into a key for accessing the cache memory, the key comprising a file identifier to a file associated with said either one of a write operation or read operation, and an offset within the file.

14. The method of claim 8, wherein the first data pattern is of a prescribed size, and further comprising the step of:

scanning the mass storage device to identify any redundant data patterns that are of the prescribed size, wherein the prescribed size is at least multiple words.

15. The method of claim 14, wherein the mass storage device is a hard disk organized in sectors, and wherein the prescribed size is a sector.

16. A method for suppressing a write operation to a mass storage device, comprising the steps of:

storing first data in cache memory in response to either one of a write operation or a read operation, wherein the first data is for a first address range;

for a subsequent write operation of second data which specifies the first address range wherein the second data is identical to the first data, suppressing the write operation so as not to write the second data to the mass storage device in response to said subsequent write operation.

17. A method for suppressing a write operation to a mass storage device, comprising the steps of:

storing first data in cache memory in response to either one of a write operation or a read operation, wherein the first data is for a first address range;

for a subsequent write operation of second data which specifies the first address range wherein the second data is identical to the first data, suppressing the write operation so as not to write the second data to the mass storage device in response to said subsequent write operation, in which the step of suppressing the write operation occurs without writing the second data to the cache memory.

18. The method of claim 16, further comprising the steps of:

during execution of an application program by a processor of a computer system, generating a request to write a file to a mass storage device;

intercepting such write file request at an input/output system level of an operating system of the computer system, in which the write file request includes a plurality of write memory block requests, each one of the plurality of write memory block requests specifying a data pattern and an address range; and for each one of the write memory block requests, testing the data pattern and address range of said one write memory block request to determine whether the data pattern and address range already are present within cache memory; and wherein the step of suppressing is performed for a write memory block request of the plurality of write memory block requests which specifies data and an address range identical to said first data and said first address range.

* * * * *